United States Patent
Matsuda

(10) Patent No.: US 12,017,723 B2
(45) Date of Patent: Jun. 25, 2024

(54) LEISURE VEHICLE

(71) Applicant: KAWASAKI MOTORS, LTD., Akashi (JP)

(72) Inventor: Yoshimoto Matsuda, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 966 days.

(21) Appl. No.: 16/962,468

(22) PCT Filed: Mar. 7, 2018

(86) PCT No.: PCT/JP2018/008782
§ 371 (c)(1),
(2) Date: Jul. 15, 2020

(87) PCT Pub. No.: WO2019/171496
PCT Pub. Date: Sep. 12, 2019

(65) Prior Publication Data
US 2021/0070388 A1    Mar. 11, 2021

(51) Int. Cl.
*B62J 45/20*   (2020.01)
*B62J 43/00*   (2020.01)
*B62J 45/414*  (2020.01)
*B62M 7/00*    (2010.01)

(52) U.S. Cl.
CPC .............. *B62J 45/20* (2020.02); *B62J 43/00* (2020.02); *B62J 45/414* (2020.02); *B62M 7/00* (2013.01)

(58) Field of Classification Search
CPC .......... B62J 45/20; B62J 43/00; B62J 45/414; B62M 7/00
See application file for complete search history.

(56) References Cited

U.S. PATENT DOCUMENTS

| | | | |
|---|---|---|---|
| 5,826,671 A | 10/1998 | Nakae et al. | |
| 2005/0211481 A1 | 9/2005 | Sasamoto | |
| 2006/0180363 A1* | 8/2006 | Uchisasai | B60K 6/48 180/65.275 |

(Continued)

FOREIGN PATENT DOCUMENTS

| | | |
|---|---|---|
| CN | 103707880 A | 4/2014 |
| EP | 0925979 A2 | 6/1999 |

(Continued)

*Primary Examiner* — Aryan E Weisenfeld
*Assistant Examiner* — Jeffrey R Chalhoub
(74) *Attorney, Agent, or Firm* — Alleman Hall & Tuttle LLP

(57) ABSTRACT

A hybrid leisure vehicle equipped with an electric motor and an engine includes: an accelerator sensor that detects an operation amount of an accelerator operation member operated by a user; a controller that includes a processor and a memory and that controls the electric motor and the engine based on a detection signal of the accelerator sensor; and a selection input device connected to the controller and operated by the user. The memory stores a plurality of mode programs each of which specifies how to change states of the electric motor and the engine depending on vehicle-related parameters. The processor selects a mode program from the plurality of mode programs in response to an input provided by the user to the selection input device, and controls the electric motor and the engine according to the selected mode program.

12 Claims, 11 Drawing Sheets

(56) References Cited

U.S. PATENT DOCUMENTS

| | | | |
|---|---|---|---|
| 2009/0167234 A1* | 7/2009 | Uechi | H02M 1/32 |
| | | | 180/65.285 |
| 2011/0040434 A1 | 2/2011 | Kishibata | |
| 2014/0100727 A1* | 4/2014 | Pietron | B60W 10/08 |
| | | | 477/3 |
| 2018/0050686 A1 | 2/2018 | Atluri et al. | |
| 2018/0099675 A1* | 4/2018 | Boisvert | B60W 10/02 |

FOREIGN PATENT DOCUMENTS

| | | |
|---|---|---|
| EP | 1738947 A2 | 1/2007 |
| GB | 2517469 A | 2/2015 |
| JP | H1175302 A | 3/1999 |
| JP | 2005247247 A | 9/2005 |
| JP | 2007055324 A | 3/2007 |
| JP | 2009153281 A | 7/2009 |
| JP | 2011031837 A | 2/2011 |
| WO | 2011088876 A1 | 7/2011 |
| WO | 2016203452 A1 | 12/2016 |

* cited by examiner

| PARALLEL HYBRID | | MODE 1 | MODE 2 | MODE 3 | MODE 4 | MODE 5 | MODE 6 |
|---|---|---|---|---|---|---|---|
| STEADY OPERATION | ENGINE | OPERATED FOR DRIVING | OPERATED FOR DRIVING | OPERATED FOR DRIVING | OPERATED FOR DRIVING | OPERATED FOR DRIVING | OPERATED FOR DRIVING |
|  | MOTOR | OPERATED FOR DRIVING | ALWAYS OPERATED FOR REGENERATION | ALWAYS OPERATED FOR REGENERATION | OPERATED FOR DRIVING | ALWAYS OPERATED FOR REGENERATION | ALWAYS OPERATED FOR REGENERATION |
| STEADY OPERATION | ENGINE | ACCELERATED | ACCELERATED | ACCELERATED | ACCELERATED | ACCELERATED | ACCELERATED |
|  | MOTOR | ACCELERATED (OR KEPT IN THE SAME STATE) | STOPPED | OPERATED FOR DRIVING (ACCELERATED) | ACCELERATED (OR KEPT IN THE SAME STATE) | STOPPED | OPERATED FOR DRIVING (ACCELERATED) |
| EV ZONE | | PRESENT | PRESENT | PRESENT | ABSENT | ABSENT | ABSENT |
| NOTES | | FUEL ECONOMY IS GIVEN PRIORITY | FUEL ECONOMY IS GIVEN PRIORITY ELECTRICITY GENERATION IS GIVEN PRIORITY ENGINE EFFICIENCY IS HIGH | FUEL ECONOMY IS GIVEN PRIORITY ELECTRICITY GENERATION IS GIVEN PRIORITY ENGINE EFFICIENCY IS HIGH SHARP ACCELERATION IS ENABLED | RIDE COMFORT IS GIVEN PRIORITY | RIDE COMFORT IS GIVEN PRIORITY ELECTRICITY GENERATION IS GIVEN PRIORITY ENGINE EFFICIENCY IS HIGH | RIDE COMFORT IS GIVEN PRIORITY ELECTRICITY GENERATION IS GIVEN PRIORITY ENGINE EFFICIENCY IS HIGH SHARP ACCELERATION IS ENABLED |

FIG. 4

LEISURE VEHICLE

TECHNICAL FIELD

The present invention relates to a hybrid leisure vehicle equipped with an electric motor and an engine.

BACKGROUND ART

A hybrid motorcycle is known which includes an engine configured as an internal combustion engine and an electric motor running on electricity supplied from a battery (see Patent Literature 1, for example). Hybrid systems include: a parallel hybrid system configured such that power generated by an electric motor and an engine can be transmitted as vehicle drive power to a drive wheel; and a series hybrid system configured such that power generated by an electric motor is transmitted as vehicle drive power to a drive wheel while an engine serves to drive an electricity generator for charging a battery.

CITATION LIST

Patent Literature

PTL 1: Japanese Laid-Open Patent Application Publication No. 2005-247247

SUMMARY OF INVENTION

Technical Problem

A hybrid motorcycle can be operated in the following three states: a state where the engine is at rest and the electric motor is in operation; a state where the electric motor is at rest and the engine is in operation; and a state where both the electric motor and the engine are in operation. The hybrid vehicle is equipped with a controller preprogrammed to select an appropriate state from the above three states depending on vehicle-related parameters (such as the acceleration demand and the remaining battery capacity).

In leisure vehicles such as a motorcycle whose body is banked during travel and a utility vehicle for travel on uneven terrains, the maneuvering feeling of the driver is significantly affected by a torque change unintended by the driver, such as a torque change caused by start or stop of the engine. Thus, the states of the engine and electric motor may be inappropriately switched if the state switching is made depending entirely on the vehicle-related parameters. Further, in some usage environments, the user may want to avoid bringing the engine into operation so as not to make noise even if the vehicle-related parameters satisfy the requirements for bringing the engine into operation. Additionally, some users dislike a change in travel feeling caused by start of the engine during travel using the electric motor and prefer to let the engine always run regardless of a somewhat reduction in fuel economy. Conventional hybrid leisure vehicles cannot meet the users' demands which vary depending on the usage environments and the preferences of the users.

If the switching among the above three states is performed solely by the user's selection, the user can freely change the states of the electric motor and engine from an operating state to a non-operating state and vice versa depending on the usage environment or the user's preference. In this case, however, a state selection inappropriate for the vehicle may be made. In order to ensure an appropriate state selection for the vehicle and at the same time enable a state change matched to the usage environment or the user's preference, the user needs to possess a plurality of vehicles having different characteristics (settings).

It is therefore an object of the present invention to provide a hybrid leisure vehicle configured to ensure an appropriate state selection for the vehicle and at the same time allow the user of the vehicle to freely modify the vehicle characteristics depending on the user's preference or the usage environment.

Solution to Problem

A leisure vehicle according to one aspect of the present invention is a hybrid leisure vehicle equipped with an electric motor and an engine, the hybrid leisure vehicle including: an accelerator sensor that detects an operation amount of an accelerator operation member operated by a user; a controller that includes a processor and a memory and that controls the electric motor and the engine based on a detection signal of the accelerator sensor; and a selection input device connected to the controller and operated by the user, wherein the memory stores a plurality of mode programs each of which specifies how to change states of the electric motor and the engine depending on vehicle-related parameters, and the processor selects a mode program from the plurality of mode programs in response to an input provided by the user to the selection input device, and controls the electric motor and the engine according to the selected mode program.

With the above configuration, since the plurality of programs are provided each of which specifies how to change the state of the electric motor (examples of the state include a driving state, a regeneration state, and a stopped state) and the state of the engine (examples of the state include an ON state and an OFF state) depending on the vehicle-related parameters (such as the required torque and the engine speed), the states of the electric motor and the engine can be changed in a wide variety of patterns depending on the vehicle-related parameters, and at the same time an appropriate state selection for the hybrid leisure vehicle can be ensured in each mode program. The user can freely modify the vehicle characteristics depending on the user's preference or the usage environment by selecting one of the plurality of mode programs at the user's discretion.

The vehicle may have a configuration in which the engine is a vehicle drive engine that generates vehicle drive power to be transmitted to a drive wheel, and the plurality of mode programs includes: a fuel economy priority mode program according to which when a predetermined first travel condition is satisfied, the engine is stopped and power generated by the electric motor is transmitted to the drive wheel and according to which when a predetermined second travel condition is satisfied, power generated by the engine is transmitted to the drive wheel; and an engine priority mode program according to which power generated by the engine is transmitted to the drive wheel both when the first travel condition is satisfied and when the second travel condition is satisfied.

With this configuration, the number of choices available to the user as to the vehicle characteristics is increased, and thus the user-friendliness can be improved. In particular, since the fuel economy priority mode program gives priority to travel not using the engine but the electric motor, the user can, in a particular usage environment, allow the vehicle to travel without engine noise by making a selection at the user's discretion.

The vehicle may have a configuration in which the engine is a vehicle drive engine that generates vehicle drive power to be transmitted to a drive wheel, and the plurality of mode programs includes: an engine-driven mode program according to which when a predetermined third travel condition is satisfied, power generated by the engine is transmitted to the drive wheel and the electric motor is stopped; and an electricity generation priority mode program according to which when the third travel condition is satisfied, power generated by the engine is transmitted to the drive wheel and is used to allow the electric motor to operate for regeneration.

With this configuration, the number of choices available to the user as to the vehicle characteristics is increased, and thus the user-friendliness can be improved. In particular, according to the electricity generation priority mode program, the engine is controlled to increase its produced positive torque by an amount corresponding to a negative torque produced by the electric motor, so that the engine can operate in a high-efficiency zone.

The vehicle may have a configuration in which the engine is a vehicle drive engine that generates vehicle drive power to be transmitted to a drive wheel, and the plurality of mode programs includes: a sharp acceleration-enabled mode program according to which when a predetermined acceleration condition is satisfied, a torque transmitted from the engine to the drive wheel is increased and the electric motor is switched from a regeneration state to a vehicle drive assist state where the electric motor provides vehicle drive power; and another mode program according to which a process is performed when the acceleration condition is satisfied, the process being different from that performed according to the sharp acceleration-enabled mode program.

With this configuration, the number of choices available to the user as to the vehicle characteristics is increased, and thus the user-friendliness can be improved. In particular, according to the sharp acceleration-enabled mode program, the electric motor is switched from a negative torque state (regeneration state) to a positive torque state (driving state), and thus sharp acceleration can be achieved by exploiting the change in torque of the electric motor from a negative one to a positive one.

The vehicle may have a configuration in which: according to the sharp acceleration-enabled mode program, when the acceleration condition is satisfied, power generated from acceleration of the engine is transmitted to the drive wheel, and the electric motor is switched from the regeneration state to a driving state where power generated by the electric motor is transmitted to the drive wheel; and according to the other mode program, when the acceleration condition is satisfied, the electric motor is kept in the regeneration state or stopped and a torque transmitted from the engine to the drive wheel is increased.

The vehicle may have a configuration in which the engine is disposed so as to be able to drive an electricity generator that charges a battery, and the plurality of mode programs includes: a charging priority mode program according to which if a remaining capacity of the battery decreases to less than a predetermined threshold when the vehicle is at rest, the electricity generator is driven by starting the engine in a state where a power transmission route between the engine and the drive wheel is cut; and a noise prevention mode program according to which even if the remaining capacity of the battery decreases to less than the threshold when the vehicle is at rest, the state of the engine is kept the same as before the remaining capacity of the battery decreases to less than the threshold.

With this configuration, the number of choices available to the user as to the vehicle characteristics is increased, and thus the user-friendliness can be improved. In particular, according to the noise prevention mode program, even if the remaining battery capacity decreases when the vehicle is at rest, the decrease in remaining capacity does not lead to production of sound derived from sharp acceleration of the engine for electricity generation. As such, sudden noise emission can be prevented when the vehicle is at rest.

The vehicle may have a configuration in which the engine is a vehicle drive engine that generates vehicle drive power to be transmitted to a drive wheel, and the plurality of mode programs includes: a first parallel drive mode program according to which when a predetermined fourth travel condition is satisfied, power generated by the engine is transmitted to the drive wheel, and power generated by the electric motor is transmitted to the drive wheel in a first pattern; and a second parallel drive mode program according to which when the fourth travel condition is satisfied, power generated by the engine is transmitted to the drive wheel, and the electric motor is allowed to operate in a second pattern different from the first pattern.

With this configuration, the number of choices available to the user as to the vehicle characteristics is increased, and thus the user-friendliness can be improved.

The hybrid vehicle according to claim 7 has a configuration in which, in the second pattern, power generated by the electric motor is transmitted to the drive wheel more intermittently than in the first pattern.

With this configuration, the number of choices of travel feeling can be increased.

The vehicle may have a configuration in which the engine is an electricity generation engine disposed so as to be able to drive an electricity generator that generates electricity to be supplied to the electric motor, and the plurality of mode programs includes: an electricity generation priority mode program according to which an output of the engine is increased when the operation amount detected by the accelerator sensor increases from an amount smaller than a predetermined amount and exceeds the predetermined amount; and a silence priority mode program according to which even if the operation amount detected by the accelerator sensor increases from an amount smaller than the predetermined amount and exceeds the predetermined amount, the output of the engine is kept the same as before the operation amount exceeds the predetermined amount. The electricity generator may be the electric motor or may be an electricity generator other than the electric motor.

With this configuration, the number of choices available to the user as to the vehicle characteristics is increased, and thus the user-friendliness can be improved. In particular, according to the silence priority mode program, even when the user gives an acceleration command, any sound derived from acceleration of the engine for electricity generation is not produced, and noise emission can be prevented.

The vehicle may have a configuration in which the plurality of mode programs includes: a charging priority mode program according to which the engine is started if a remaining capacity of the battery decreases to less than a predetermined threshold when the vehicle is at rest; and a noise prevention mode program according to which even if the remaining capacity of the battery decreases to less than the threshold when the vehicle is at rest, the state of the engine is kept the same as before the remaining capacity of the battery decreases to less than the threshold.

With this configuration, the number of choices available to the user as to the vehicle characteristics is increased, and thus the user-friendliness can be improved. In particular, according to the noise prevention mode program, even if the remaining battery capacity decreases when the vehicle is at rest, the decrease in remaining capacity does not lead to production of sound derived from sharp acceleration of the engine for electricity generation. As such, sudden noise emission can be prevented when the vehicle is at rest.

Advantageous Effects of Invention

The present invention makes it possible to ensure an appropriate state selection for a hybrid leisure vehicle and at the same time allow the user of the vehicle to freely modify the vehicle characteristics depending on the user's preference or the usage environment.

BRIEF DESCRIPTION OF DRAWINGS

FIG. 4 illustrates the different modes of the motorcycle of FIG. 1.

DESCRIPTION OF EMBODIMENTS

Hereinafter, embodiments will be described with reference to the drawings.

Embodiment 1

Figure 1:
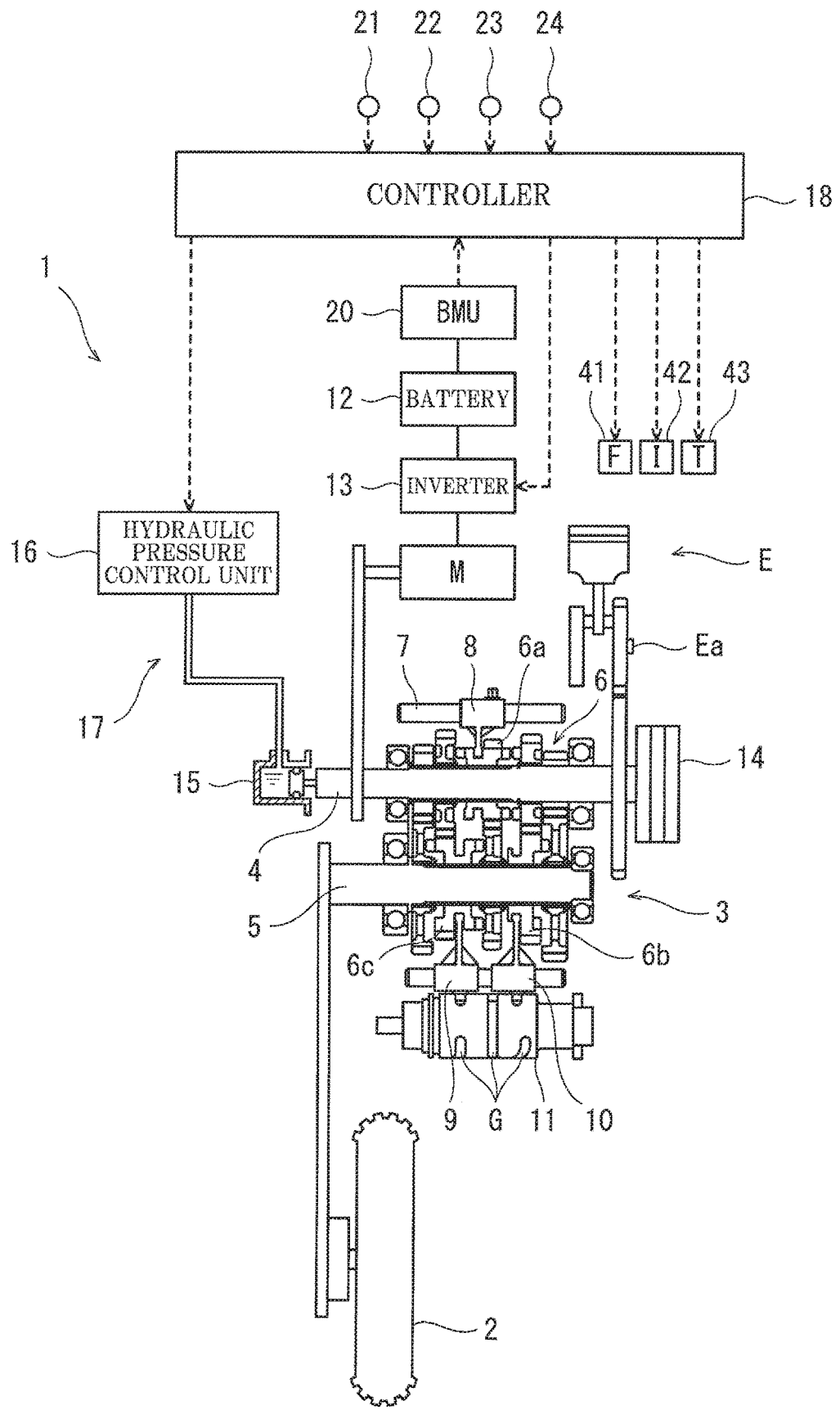
FIG. 1 is a block diagram of a parallel hybrid motorcycle according to Embodiment 1.

FIG. 1 is a block diagram of a parallel hybrid motorcycle 1 according to Embodiment 1. While in the present embodiment the motorcycle is described as an example of the leisure vehicle of the present invention, the leisure vehicle may be another type of vehicle such as a utility vehicle. As shown in FIG. 1, the motorcycle 1 includes an engine E (internal combustion engine) serving both as a drive source for travel and as a drive source for electricity generation and an electric motor M serving both as a drive source for travel and as an electricity generator. That is, the engine E is a vehicle drive engine that generates vehicle drive power transmitted to a drive wheel 2, and the motorcycle 1 employs a parallel hybrid system.

The motorcycle 1 includes a transmission 3 that changes the speed of rotation produced by power from the engine E and the electric motor M and that transmits the resulting rotation to the drive wheel 2. The transmission 3 is, for example, a dog clutch transmission, and includes an input shaft 4 and an output shaft 5. The input shaft 4 receives power from the engine E and the electric motor M. The output shaft 5 transmits power to the drive wheel 2 through an output transmission mechanism 7 (e.g., a chain or a belt). The input shaft 4 is coupled to the output shaft 5 via a plurality of gear trains 6 with different reduction ratios so as to be capable of power transmission to the output shaft 5.

In the transmission 3, shift forks 8 to 10 are slidably supported by a support shaft 7 disposed parallel to the input shaft 4 and the output shaft 5. A first end of the shift fork 8 is connected to a dog gear 6a of the input shaft 4, and first ends of the other shift forks 9 and 10 are connected to dog gears 6b and 6c of the output shaft 5. Second ends of the shift forks 8 to 10, which are opposite to the first ends, are fitted in guide grooves G of a shift drum 11.

Once the shift drum 11 is rotated in response to an operation of a shift operation member (not shown) by the user, the shift forks 8 to 10 guided by the guide grooves G respectively cause the dog gears 6a to 6c to slide along the output shaft 5, thus bringing one of the gear trains 6 that has a desired reduction ratio into a power transmission state. In this manner, a power transmission route with a desired shift position is selected. The shift operation member is, for example, a shift pedal operated by a foot of the user. Once the shift drum 11 is rotated to a neutral position, the transmission 3 is brought into a neutral state where power transmission between the input shaft 4 and the output shaft 5 is disabled.

The electric motor M is configured to generate power from electricity supplied from a battery 12 through an inverter 13, and is further configured to generate electricity from power transmitted from the input shaft 4 of the transmission 3 and charge the battery 12. The electric motor M is connected to the input shaft 4 of the transmission 3 via a power transmission mechanism (e.g., a gear or a belt). That is, the electric motor M is connected to the input shaft 4 through a different power transmission route than the engine E.

The engine E includes a crankshaft Ea, which is connected to the input shaft 4 of the transmission 3 via a main clutch 14 (e.g., a multi-plate clutch) so as to be capable of power transmission to the input shaft 4. The main clutch 14 is mounted on one end of the input shaft 4. On the other end of the input shaft 4 is mounted a hydraulic cylinder 15. To the hydraulic cylinder 15 is connected a hydraulic pressure control unit 16. Once a clutch actuation command is input to the hydraulic pressure control unit 16, the hydraulic pressure control unit 16 applies a hydraulic pressure equal to or higher than a predetermined level to the hydraulic cylinder 15, and the hydraulic cylinder 15 applies clutch actuation power to the main clutch 14 through a rod inserted in the input shaft 4, so that the main clutch 14 is brought into a disengaged state. Once a clutch deactuation command is input to the hydraulic pressure control unit 16, the hydraulic pressure control unit 16 stops applying the hydraulic pressure to the hydraulic cylinder 15, so that the main clutch 14 is brought into an engaged state. That is, the hydraulic cylinder 15 and the hydraulic pressure control unit 16 constitute a clutch actuator 17.

Figure 2:
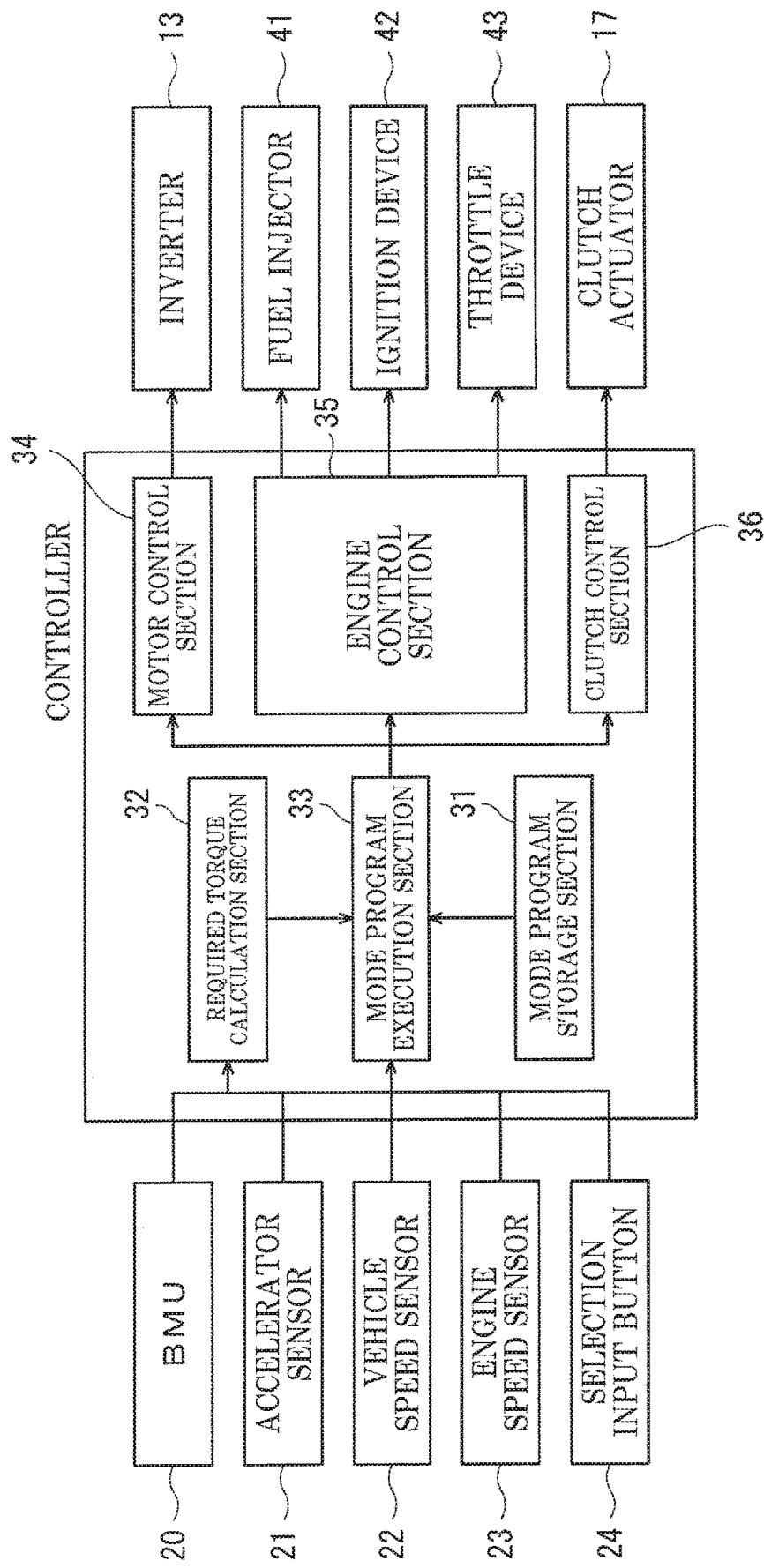
FIG. 2 is a block diagram of a control system of the motorcycle of FIG. 1.

FIG. 2 is a block diagram of a control system of the motorcycle 1 of FIG. 1. As shown in FIGS. 1 and 2, the motorcycle 1 is equipped with a controller 18. The controller 18 receives output signals such as those from a battery management unit 20, an accelerator sensor 21, a vehicle speed sensor 22, an engine speed sensor 23, and a selection input button 24 (selection input device). The battery management unit 20 detects the remaining capacity and voltage of the battery 12. The accelerator sensor 21 detects the operation amount of an accelerator operation member (not shown) operated by the user (the operation amount corresponds to an acceleration/deceleration demand). The vehicle speed sensor 22 detects the travel speed of the motorcycle 1. The engine speed sensor 23 detects the rotational speed of the crankshaft Ea of the engine E. The selection input button 24 is operated by the user to input a mode selection, and outputs information indicating the selected mode to the controller 18. The selection input button 24 is mounted on a handlebar (not shown) of the motorcycle 1, and input to the selection input button 24 is enabled when the key position of a master key cylinder (not shown) is at an ON position.

The controller 18 includes a processor, a volatile memory, a non-volatile memory, and an I/O interface as hardware components. The controller 18 includes a mode program storage section 31, a required torque calculation section 32, a mode program execution section 33, a motor control section 34, an engine control section 35, and a clutch control section 36 as functional components. The mode program storage section 31 is implemented by the non-volatile memory. The required torque calculation section 32, mode program execution section 33, motor control section 34, engine control section 35, and clutch control section 36 are implemented by receiving information such as those provided from the battery management unit 20, accelerator sensor 21, vehicle speed sensor 22, engine speed sensor 23, and selection input button 24 through the I/O interface and executing processing procedures using the volatile memory according to programs stored in the non-volatile memory with reference to the received information.

The mode program storage section 31 stores in advance a plurality of mode programs each of which specifies how to change the states of the electric motor M and the engine E depending on the vehicle-related parameters (such as the required torque and the engine speed). The required torque calculation section 32 determines the level of an acceleration demand (or a deceleration demand) of the user based on an output signal from the accelerator sensor 21, determines the travel state of the motorcycle 1 based on output signals such as those from the vehicle speed sensor 22 and the engine speed sensor 23, and calculates the torque required to be transmitted to the drive wheel 2 in order to adapt the travel state of the motorcycle 1 to the acceleration or deceleration demand of the user (this torque is referred to as the required torque).

The mode program execution section 33 retrieves, from the mode program storage section 31, a mode program associated with the mode selected by the user using the selection input button 24. The mode program execution section 33 outputs operation command values to the motor control section 34, engine control section 35, and clutch control section 36 according to the retrieved mode program and based on the required torque calculated by the required torque calculation section 32.

The motor control section 34 controls the operation of the electric motor M by controlling the inverter 13 in response to a command received from the mode program execution section 33. The engine control section 35 controls the operation of the engine E by controlling a fuel injector 41, an ignition device 42, and a throttle device 43 in response to a command received from the mode program execution section 33. The clutch control section 36 controls the clutch actuator 17 in response to a command received from the mode program execution section 33. While in the present embodiment the controller 18 consists of a single controller, a functionally distributed system composed of a plurality of controllers may be employed.

Figure 3C:
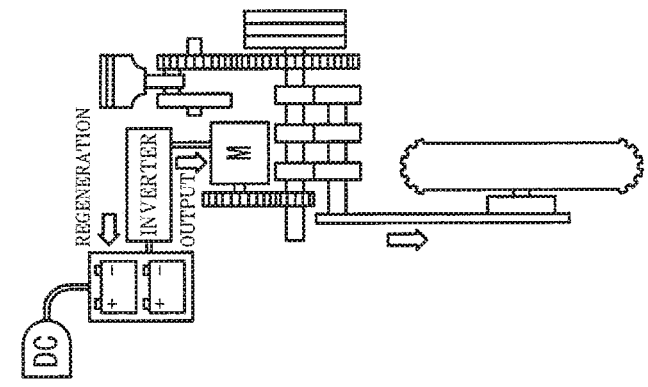
FIGS. 3A to 3C illustrate power transmission states in different modes of the motorcycle of FIG. 1.
Figure 3B:
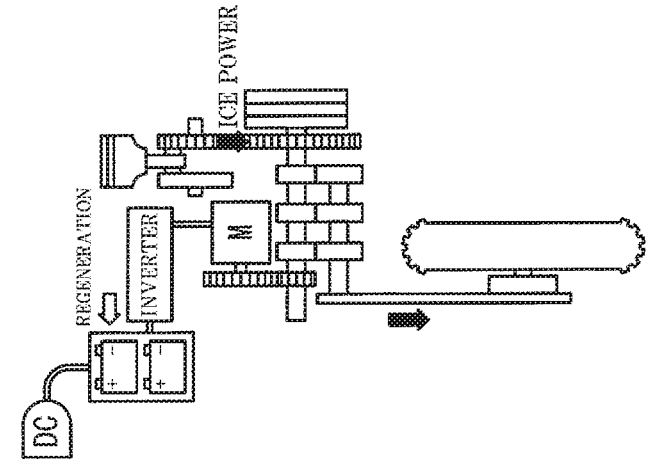
Figure 3A:
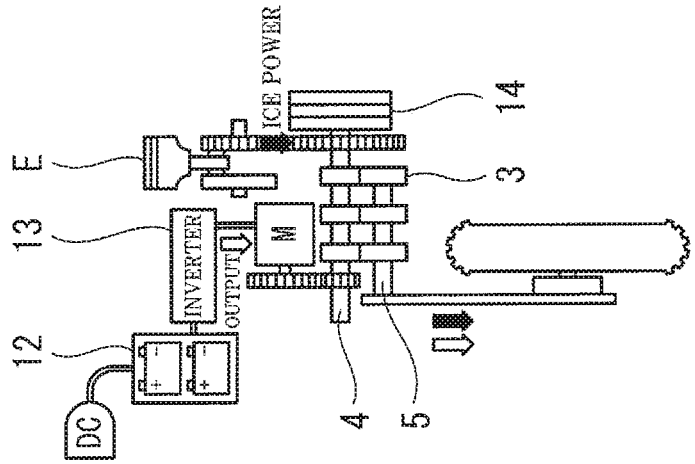

FIGS. 3A to 3C illustrate power transmission states in different modes of the motorcycle 1 of FIG. 1. As shown in FIGS. 3A to 3C, the power transmission states of the motorcycle 1 include an engine-motor travel state (HEV state), an engine travel state (EG state), and a motor travel state (EV state). Selection among these power transmission states is made according to the mode programs stored in the mode program storage section 31.

In the HEV state, as shown in FIG. 3A, the main clutch 14 is in an engaged state, the electric motor M is in a driving state, and the engine E is in a driving state. That is, in the HEV state, vehicle drive power is transmitted to the drive wheel 2 from both the engine E and the electric motor M.

In the EG state, as shown in FIG. 3B, the main clutch 14 is in an engaged state, the electric motor M is in a regeneration state, and the engine E is in a driving state. That is, in the EG state, vehicle drive power is transmitted to the drive wheel 2 only from the engine E, and the electric motor M receives power transmitted from the engine E through the input shaft 4 and generates electricity. In the EG state, the electric motor M need not be in a regeneration state but may be brought into a free-running state (state where the motor circuit is opened to prevent a resistance caused by generation of electromotive force).

In the EV state, as shown in FIG. 3C, the main clutch 14 is in a disengaged state, the electric motor M is in a driving state, and the engine E is in a stopped state. That is, in the EV state, vehicle drive power is transmitted to the drive wheel 2 only from the electric motor M.

FIG. 4 illustrates the different modes of the motorcycle 1 of FIG. 1. FIGS. 5 to 8 are maps which respectively show the required torque versus engine speed relationships in the modes 1, 2, 4, and 5 shown in FIG. 4. In each map, the contour line represents the thermal efficiency of the engine E, and the reference sign X designates a region where the highest efficiency is exhibited. In each map, the curve designated by the reference sign RL represents a steady torque required during travel of the vehicle, and this steady torque is referred to as "road load". The maps of FIGS. 5 to 8 are stored as a part of the mode programs in the mode program storage section 31. These maps are assigned HEV, EG, and EV zones.

Figure 5:
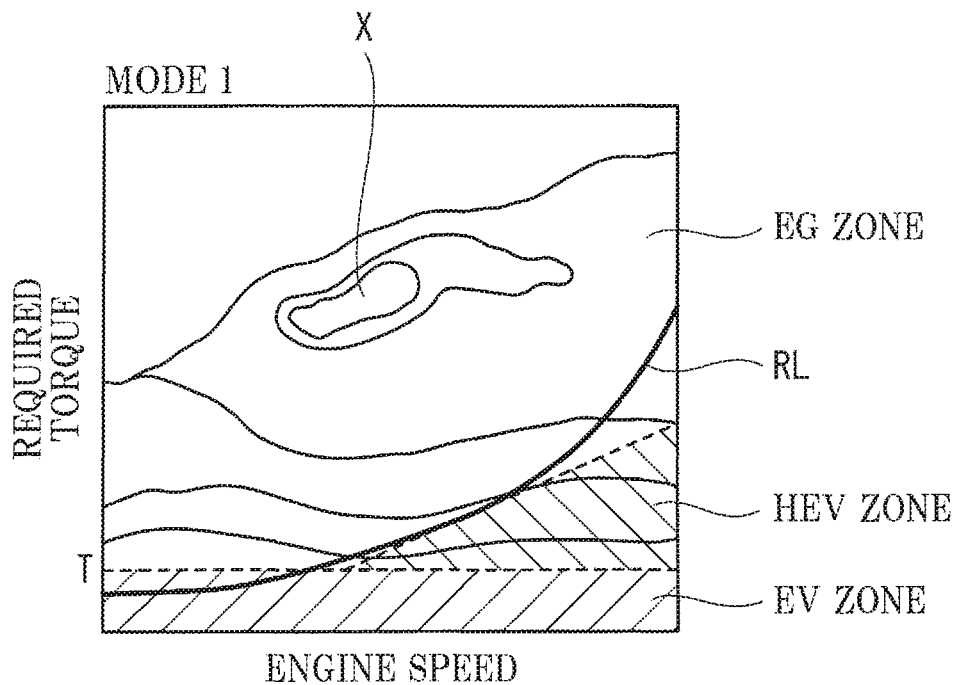
FIG. 5 is a map showing the required torque versus engine speed relationship in the mode 1 shown in FIG. 4.

In the mode 1, as shown in FIGS. 4 and 5, when a predetermined first travel condition is satisfied, the motorcycle is brought into the EV state where the engine E is stopped and where power generated by the electric motor M is transmitted to the drive wheel 2. When a predetermined second travel condition is satisfied, the motorcycle is brought into the HEV state where power generated by the engine E and power generated by the electric motor M are transmitted to the drive wheel 2. When a predetermined third travel condition is satisfied, the motorcycle is brought into the EG state where the electric motor M is stopped or allowed to operate for regeneration and where power generated by the engine E is transmitted to the drive wheel 2.

Specifically, when the required torque calculated by the required torque calculation section 32 is a low torque less than a predetermined threshold T (EV zone), the motorcycle is brought into the EV state irrespective of the engine speed since the thermal efficiency of the engine E is low. When the required torque is equal to or higher than the threshold T but lower than the value of the road load curve RL (HEV zone) and the engine speed is higher than a predetermined value, the motorcycle is brought into the HEV state. When the required torque is equal to or higher than the threshold T and equal to or higher than the value of the road load curve RL (EG zone), the motorcycle is brought into the EG state since the thermal efficiency of the engine E is high.

The program for the mode 1 is a fuel economy priority mode program because of the presence of the EV zone where the engine E is not used. Since the fuel economy priority mode program includes the EV zone where travel not using the engine E but the electric motor M is given priority, the user can, in a particular usage environment, allow the vehicle to travel without engine noise by selecting the mode 1. The program for the mode 1 serves also as an engine-driven mode program since, according to this program, the motorcycle is brought into the EG state when the required torque is equal to or higher than the value of the road load curve RL.

Figure 6:
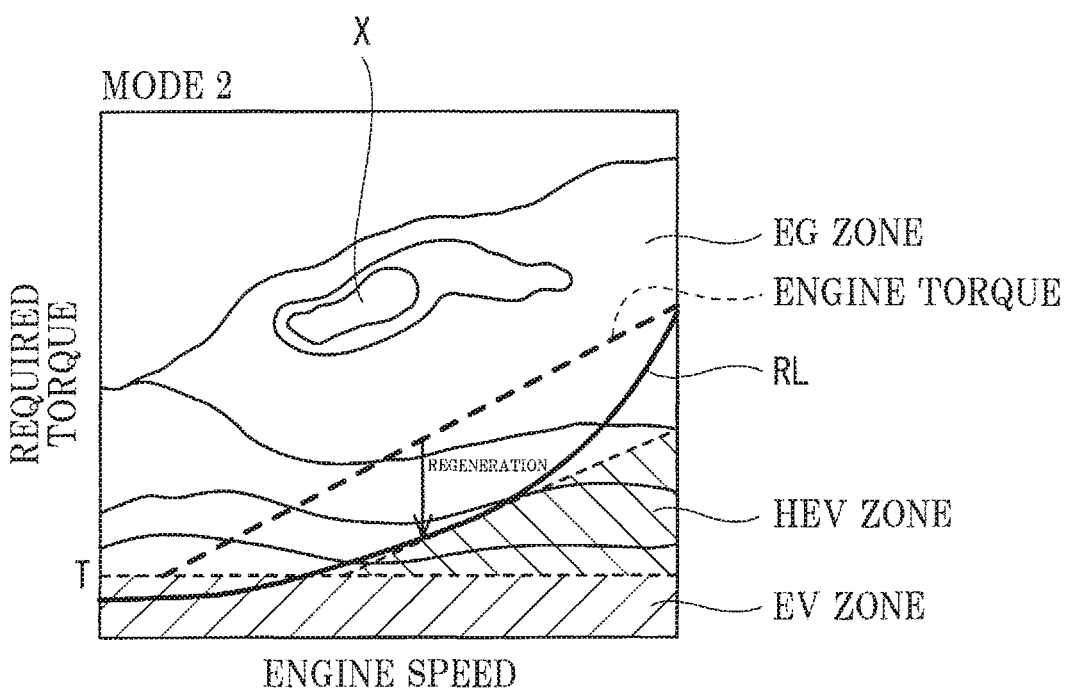
FIG. 6 is a map showing the required torque versus engine speed relationship in the mode 2 shown in FIG. 4.

As shown in FIGS. 4 and 6, the mode 2 is the same as the mode 1 in regard to the EV zone and HEV zone, but differs from the mode 1 in the process performed in the EG zone. When the required torque calculated by the required torque calculation section 32 is equal to or higher than the threshold T and equal to or higher than the value of the road load curve RL, power generated by the engine E is transmitted to the drive wheel 2 and is used to allow the electric motor M to operate for regeneration (electricity generation). Thus, the engine E is controlled to increase its produced positive torque by an amount corresponding to a negative torque produced from regeneration by the electric motor M, so that the engine E can operate in a zone where the thermal efficiency of the engine E is high. That is, the program for the mode 2 is an electricity generation priority mode program.

Figure 7:
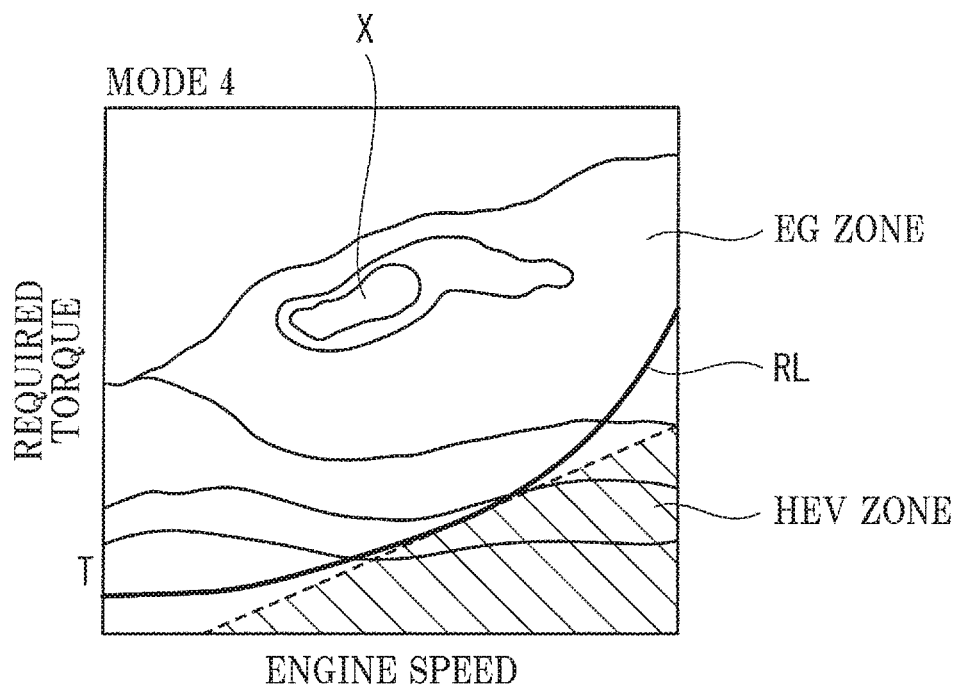
FIG. 7 is a map showing the required torque versus engine speed relationship in the mode 4 shown in FIG. 4.

As shown in FIGS. 4 and 7, the mode 4 includes the HEV zone and the EG zone but is devoid of the EV zone. Thus, under any travel conditions, power generated by the engine E is transmitted to the drive wheel 2. Specifically, the motorcycle is not driven by the electric motor M even in the zone where the required torque is lower than the threshold T. That is, the program for the mode 4 is an engine priority mode program.

Figure 8:
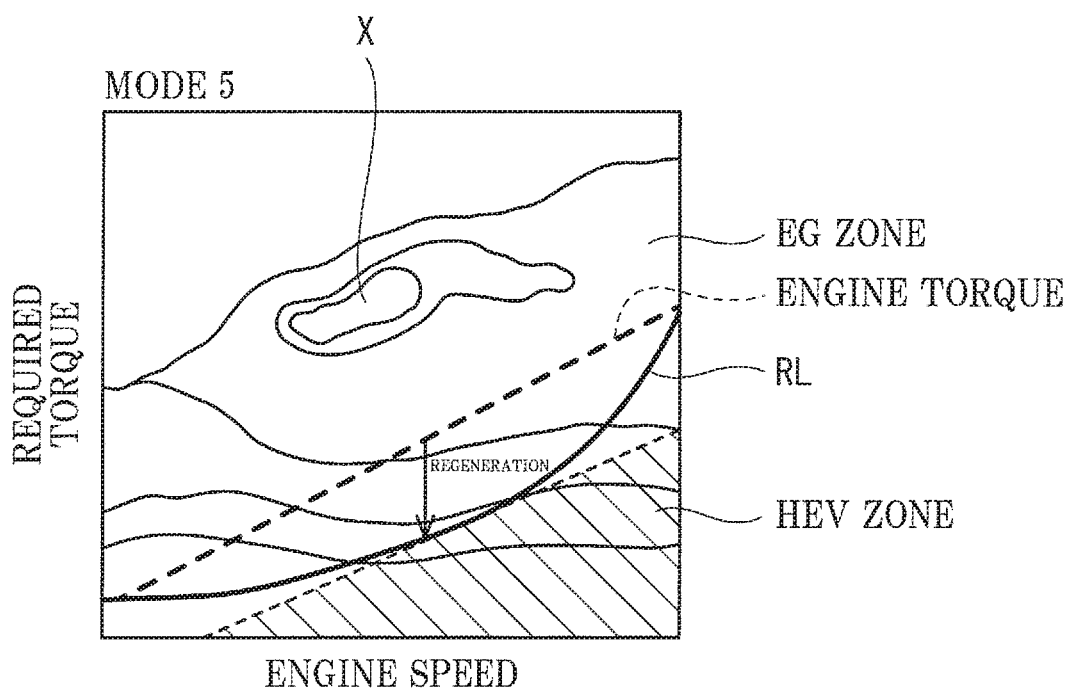
FIG. 8 is a map showing the required torque versus engine speed relationship in the mode 5 shown in FIG. 4.

As shown in FIGS. 4 and 8, the mode 5 is the same as the mode 4 in regard to the absence of the EV zone and to the process performed in the HEV zone, but differs in the process performed in the EG zone just as does the mode 2 compared to the mode 1. When the required torque calculated by the required torque calculation section 32 is equal to or higher than the value of the road load curve RL, power generated by the engine E is transmitted to the drive wheel 2 and is used to allow the electric motor M to operate for regeneration (electricity generation). Thus, the engine E is controlled to increase its produced positive torque by an amount corresponding to a negative torque produced from regeneration by the electric motor M, so that the engine E can operate in a zone where the thermal efficiency of the engine E is high. That is, the program for the mode 5 is an electricity generation priority mode program.

In the mode programs described above, how to change the operation of the electric motor M and engine E (e.g., ON/OFF of the motor and engine) is determined based on the required torque calculated with reference to the amount of accelerator operation, the vehicle speed, and the engine speed. Another factor may be used as a basis for determining how to change the operation of the electric motor M and engine E. For example, in each mode program, how to change the operation of the electric motor M and engine E may be determined based on vehicle-related parameters such as the characteristics of the road on which the motorcycle 1 is traveling (e.g., the slope and shape of the road), the number of occupants, the type of the road surface (e.g., a paved road surface, an unpaved road surface, or a snow-covered road surface), values detected by acceleration rate sensors such as an IMU, the remaining battery capacity, and various control commands (e.g., an ABS command and a cruise control command).

Figure 9A:
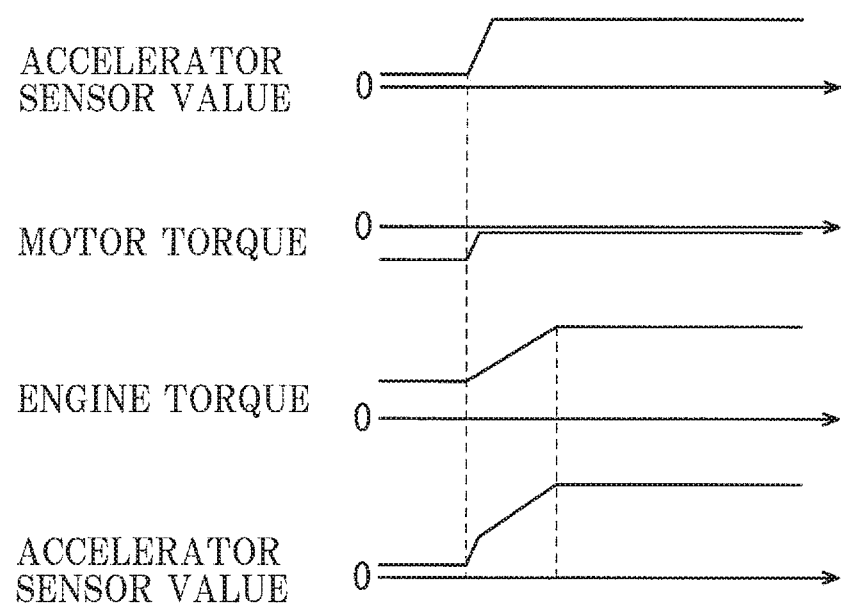
FIG. 9A is a timing chart for a situation where sharp acceleration is demanded in the modes 2 and 5 shown in FIG. 4.
Figure 9B:
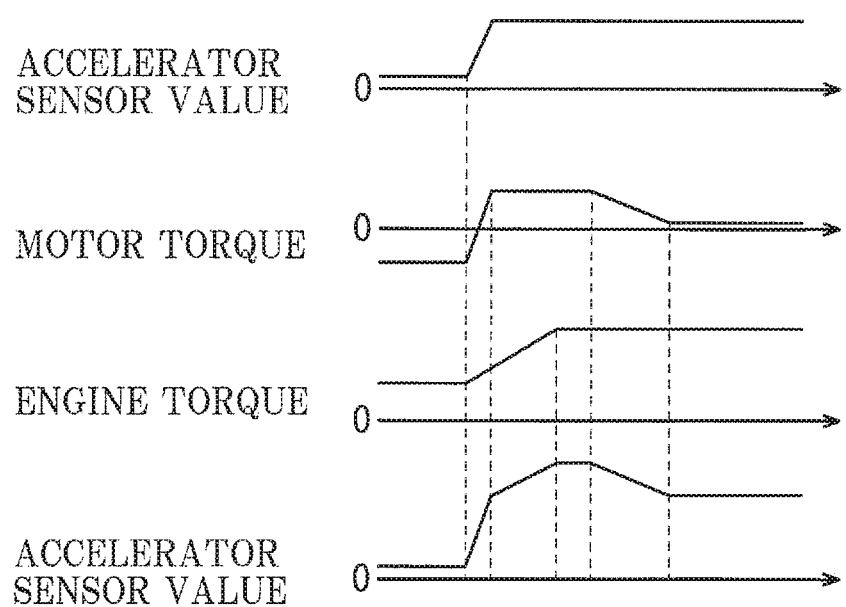
FIG. 9B is a timing chart for a situation where sharp acceleration is demanded in the modes 3 and 6 shown in FIG. 4.

FIG. 9A is a timing chart for a situation where sharp acceleration is demanded in the modes 2 and 5 shown in FIG. 4, and FIG. 9B is a timing chart for a situation where sharp acceleration is demanded in the modes 3 and 6 shown in FIG. 4. In the modes 2 and 5, as shown in FIG. 9A, when a predetermined sharp acceleration condition is satisfied in a travel state where power generated by the engine E is transmitted to the drive wheel 2 and is used to allow the electric motor M to operate for regeneration, the mode program execution section 33 instructs the engine control section 35 to increase the torque of the engine E and accelerate the drive wheel and instructs the motor control section 34 to switch the electric motor M from the regeneration state to a stopped state (or a free-running state) or keep the electric motor M in the regeneration state. The sharp acceleration condition is that the user has operated the accelerator operation member to make a sharp acceleration and the accelerator sensor 21 has detected an increase rate in throttle opening degree which is equal to or greater than a predetermined value. Alternatively, when the predetermined sharp acceleration condition is satisfied, the torque of the engine E may be unchanged or decreased, and the drive wheel 2 may be accelerated by torque transmission from the electric motor M to the drive wheel 2.

In the modes 3 and 6, as shown in FIG. 9B, when the sharp acceleration condition is satisfied in a travel state where power generated by the engine E is transmitted to the drive wheel 2 and is used to allow the electric motor M to operate for regeneration, the torque transmitted from the engine E to the drive wheel 2 is increased to accelerate the drive wheel, and the electric motor M is switched from the regeneration state to a vehicle drive assist state (accelerated driving state) where the electric motor M provides vehicle drive power. Since the electric motor M is switched from a negative torque state (regeneration state) to a positive torque state (driving state), sharp acceleration can be achieved by exploiting the change in torque of the electric motor M from a negative one to a positive one. That is, the programs for the modes 3 and 6 are sharp acceleration-enabled mode programs. The mode 3 is the same as the mode 1, except for the process performed during sharp acceleration. The mode 6 is the same as the mode 4, except for the process performed during sharp acceleration.

In the modes 1 and 4, the electric motor M is not in the regeneration state immediately before the sharp acceleration condition is satisfied; thus, it is advantageous that when the sharp acceleration condition is satisfied, the electric motor M be accelerated or kept in the same state as immediately before the satisfaction of the sharp acceleration condition. Not only a hybrid vehicle incorporating a plurality of mode programs but also a common hybrid vehicle can employ the above process in which, when the sharp acceleration condition is satisfied with the electric motor M in the regeneration state, the torque transmitted from the engine E to the drive wheel 2 is increased to accelerate the drive wheel and the electric motor M is switched from the regeneration state to the driving state to add a torque to the drive wheel 2.

Figure 10A:
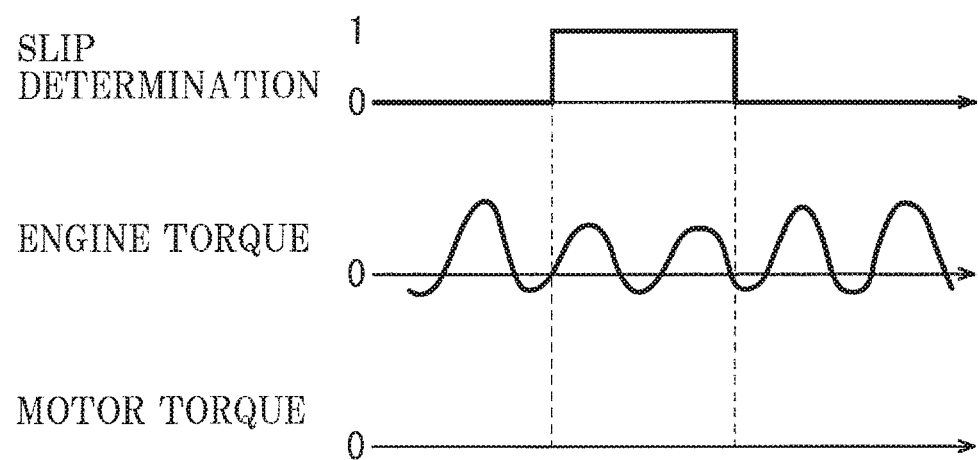
FIG. 10A is a timing chart for a first parallel drive mode.
Figure 10B:
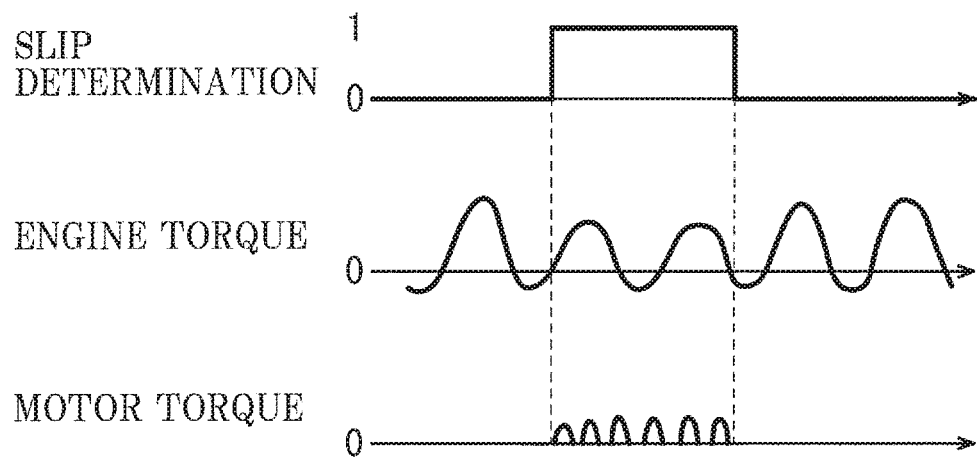
FIG. 10B is a timing chart for a second parallel drive mode.

FIG. 10A is a timing chart for a first parallel drive mode, and FIG. 10B is a timing chart for a second parallel drive mode. In the first parallel drive mode, as shown in FIG. 10A, when the drive wheel 2 is determined to have slipped based on, for example, the fact that the difference in rotational speed between the front and rear wheels is detected to have exceeded a predetermined threshold, the torque of the engine E is corrected to a smaller value to facilitate recovery of traction. When it is determined that the slip has been resolved, the decreasing correction to the torque of the engine E is stopped.

In the second parallel drive mode, as shown in FIG. 10B, when the drive wheel 2 is determined to have slipped, the torque of the engine E is corrected to a smaller value, and the electric motor M is intermittently (or periodically) operated to intermittently (or periodically) transmit power to the drive wheel 2, thereby facilitating quick recovery of traction. When it is determined that the slip has been resolved, the decreasing correction to the torque of the engine E and the intermittent operation of the electric motor M are stopped. This process can increase the number of choices of travel feeling.

The operation pattern of the electric motor M in the first parallel drive mode and the operation pattern of the electric motor M in the second parallel drive mode may vary from those described above, as long as the operation pattern in the first parallel drive mode and the operation pattern in the second parallel drive mode are different from each other under the same travel condition. For example, in either the first parallel drive mode or second parallel drive mode, a negative part of the periodically fluctuating torque of the engine E may be canceled by a positive torque of the electric motor M to reduce the total torque fluctuation, or a positive torque of the electric motor M may be added to a positive part of the periodically fluctuating torque of the engine E to increase the total torque fluctuation.

In the configuration described above, since a plurality of mode programs are provided each of which specifies how to change the operation status (e.g., ON/OFF) of the electric motor M and engine E depending on vehicle-related parameters (e.g., the required torque and the engine speed), the operation status of the electric motor M and engine E can be changed in a wide variety of patterns depending on the vehicle-related parameters, and at the same time an appropriate state selection for the hybrid motorcycle 1 can be ensured in each mode program. The user can freely modify the characteristics of the hybrid motorcycle 1 depending on the user's preference or the usage environment by selecting one of the plurality of mode programs at the user's discretion.

Embodiment 2

Figure 11:
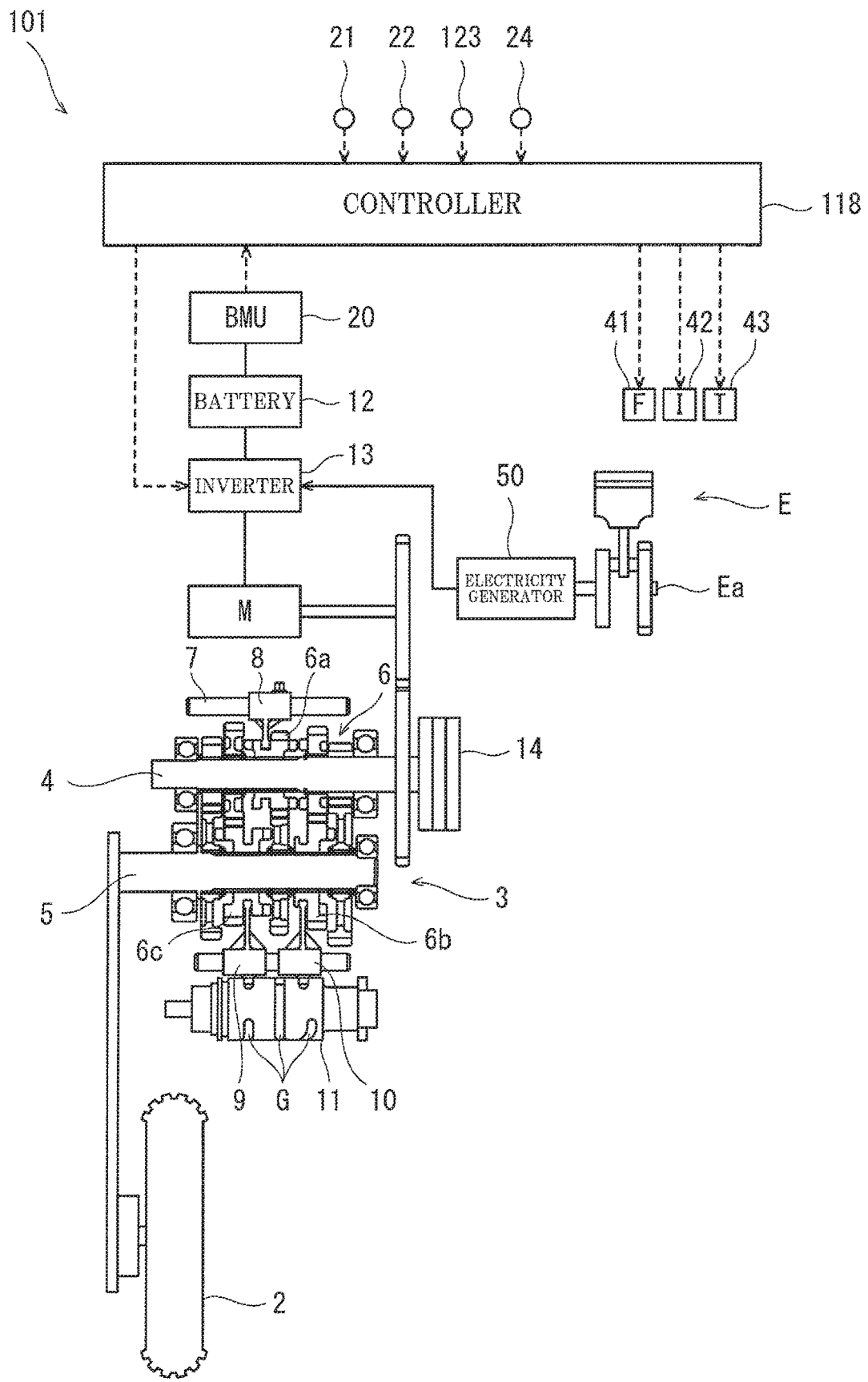
FIG. 11 is a block diagram of a series hybrid motorcycle according to Embodiment 2.

FIG. 11 is a block diagram of a series hybrid motorcycle 101 according to Embodiment 2. The elements identical to those of Embodiment 1 are denoted by the same reference signs and will not be described repeatedly. As shown in FIG. 11, the motorcycle 101 includes the engine E (internal combustion engine) as a drive source for electricity generation and the electric motor M as a drive source for travel. That is, the engine E is an electricity generation engine for driving an electricity generator 50 that generates electricity to be supplied to the electric motor M and charges the battery 12, and the motorcycle 101 employs a series hybrid system.

A controller 118 receives information about the battery 12 from the battery management unit 20. The controller 118 receives detection information such as those from the accelerator sensor 21, the vehicle speed sensor 22, a motor speed sensor 123, and the selection input button 24. Based on the received information, the controller 118 controls the inverter 13 for control of the electric motor M, and controls the fuel injector 41, ignition device 42, and throttle device 43 of the engine E. Like the controller 18 of Embodiment 1, the controller 118 includes a storage section storing a plurality of mode programs, a mode program execution section that executes a mode program retrieved from the storage section, a motor control section, and an engine control section.

Figure 12A:
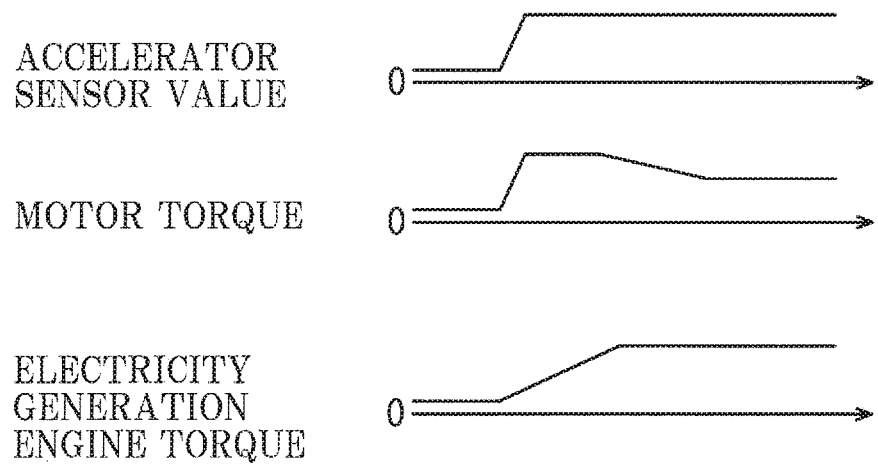
FIG. 12A is a timing chart for a situation where the motorcycle of FIG. 11 is shifted from steady travel to accelerating travel in an electricity generation priority mode.
Figure 12B:
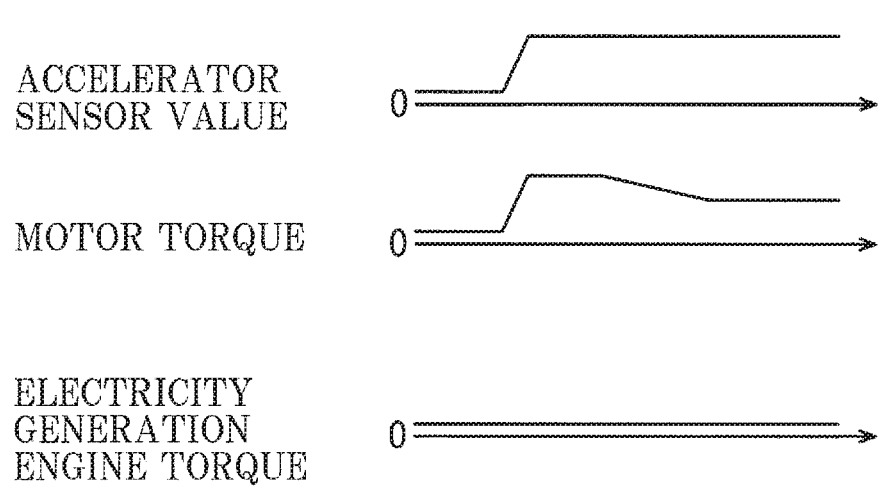
FIG. 12B is a timing chart for a situation where the motorcycle is shifted from steady travel to accelerating travel in a silence priority mode.

FIG. 12A is a timing chart for a situation where the motorcycle 101 of FIG. 11 is shifted from steady travel to accelerating travel in an electricity generation priority mode, and FIG. 12B is a timing chart for a situation where the motorcycle 101 is shifted from steady travel to accelerating travel in a silence priority mode. In the case where the electricity generation priority mode program has been selected, as shown in FIG. 12A, when the operation amount detected by the accelerator sensor 21 increases from an amount smaller than a predetermined amount and exceeds the predetermined amount (namely, when the user performs a given acceleration operation on the accelerator operation member), the torque of the engine E for electricity generation is increased and the battery 12 is charged to address an increased electricity consumption due to an increase in the torque of the electric motor M.

In the case where the silence priority mode program has been selected, as shown in FIG. 12B, when the operation amount detected by the accelerator sensor 21 increases from an amount smaller than a predetermined amount and exceeds the predetermined amount (namely, when the user performs a given acceleration operation on the accelerator operation member), the torque of the engine E is kept the same as immediately before (before the operation amount exceeds the predetermined amount). Thus, according to the silence priority mode program, even when the user gives an acceleration command, any sound derived from acceleration of the engine E for electricity generation is not produced, and noise emission can be prevented.

Figure 13A:
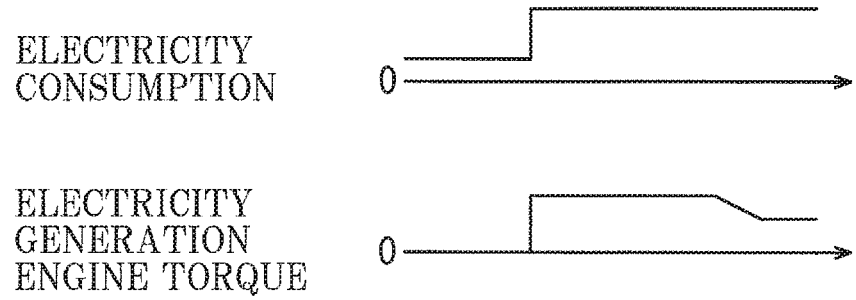
FIG. 13A is a timing chart for a situation where the electricity consumption of the motorcycle of FIG. 11 increases when the motorcycle is at rest in a charging priority mode.
Figure 13B:
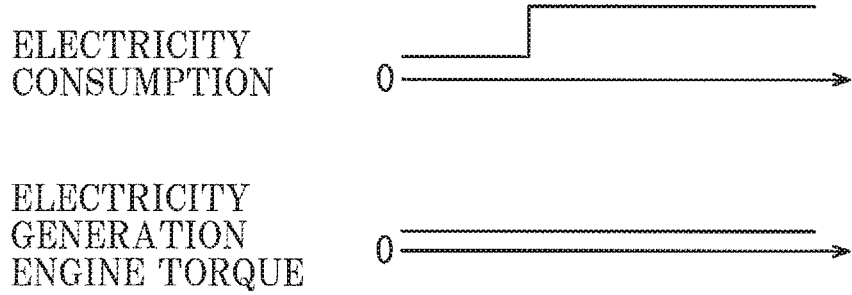
FIGS. 13B and 13C are each a timing chart for a situation where the electricity consumption of the motorcycle increases when the motorcycle is at rest in a noise prevention mode.
Figure 13C:
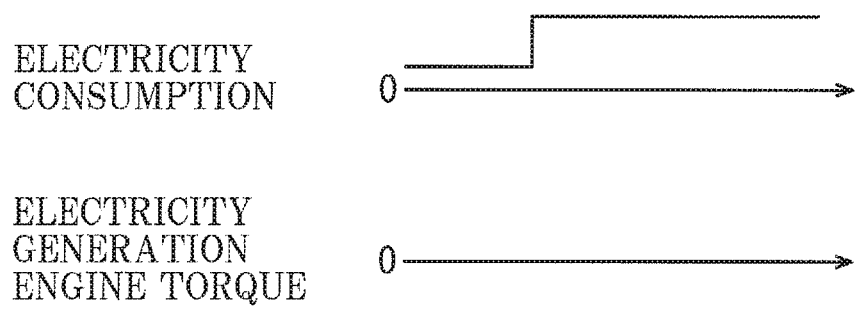

FIG. 13A is a timing chart for a situation where the electricity consumption of the motorcycle 101 of FIG. 11 increases when the motorcycle 101 is at rest in a charging priority mode, and FIGS. 13B and 13C are each a timing chart for a situation where the electricity consumption of the motorcycle 101 increases when the motorcycle 101 is at rest in a noise prevention mode. In the case where the charging priority mode program has been selected, as shown in FIG. 13A, the engine E is started if the remaining capacity of the battery 12 decreases to less than a predetermined threshold when the motorcycle 101 is at rest.

In the case where the noise prevention mode program has ben selected, as shown in FIGS. 13B and 13C, even if the remaining capacity of the battery 12 decreases to less than the threshold when the motorcycle 101 is at rest, the state of the engine E is kept the same as before the remaining capacity of the battery 12 decreases to less than the threshold. Thus, according to the noise prevention mode program, even if the remaining capacity of the battery 12 decreases when the motorcycle 101 is at rest, the decrease in remaining capacity does not lead to production of sound derived from sharp acceleration of the engine E for electricity generation. As such, sudden noise emission can be prevented when the vehicle is at rest. While in the examples described above the charging priority mode program and the noise prevention mode program are employed in a series hybrid vehicle, these modes may be employed in a parallel hybrid vehicle.

REFERENCE CHARACTERS LIST 1, 101 hybrid vehicle
2 drive wheel
3 transmission
12 battery
17 clutch actuator
18, 118 controller
24 selection input button (selection input device)
E engine
M electric motor

The invention claimed is:

1. A hybrid leisure vehicle equipped with an electric motor and an engine, the hybrid leisure vehicle comprising:
a controller that comprises a processor and a memory and that controls the electric motor and the engine based on an operation amount of an accelerator operation member operated by a user, wherein
the memory stores a plurality of mode programs each of which specifies how to change states of the electric motor and the engine depending on vehicle-related parameters,
the processor selects a mode program from the plurality of mode programs in response to an input provided by the user, and controls the electric motor and the engine according to the selected mode program,
the plurality of mode programs includes a specific mode program in which the vehicle switches from an EV state to a HEV state and from the HEV state to an EG state in order as a required torque increases,
the EV state is a state where the engine is stopped and where power generated by the electric motor is transmitted to a drive wheel,
the HEV state is a state where power generated by the engine and power generated by the electric motor are transmitted to the drive wheel,
the EG state is a state where the electric motor is stopped or allowed to operate for regeneration and where power generated by the engine is transmitted to the drive wheel,
the engine is a vehicle drive engine that generates vehicle drive power to be transmitted to the drive wheel,
the plurality of mode programs includes:
a first parallel drive mode program according to which when a predetermined fourth travel condition is satisfied, power generated by the engine is transmitted to the drive wheel, and power generated by the electric motor is transmitted to the drive wheel in a first pattern; and
a second parallel drive mode program according to which when the fourth travel condition is satisfied, power generated by the engine is transmitted to the drive wheel, and the electric motor is allowed to operate in a second pattern different from the first pattern, and in the second pattern, power generated by the electric motor is transmitted to the drive wheel more intermittently than in the first pattern.

2. The leisure vehicle according to claim 1, wherein the plurality of mode programs includes:
a fuel economy priority mode program according to which when a predetermined first travel condition is satisfied, the engine is stopped and power generated by the electric motor is transmitted to the drive wheel and according to which when a predetermined second travel condition is satisfied, power generated by the engine is transmitted to the drive wheel; and
an engine priority mode program according to which power generated by the engine is transmitted to the drive wheel both when the first travel condition is satisfied and when the second travel condition is satisfied.

3. The leisure vehicle according to claim 1, wherein the plurality of mode programs includes:
an engine-driven mode program according to which when a predetermined third travel condition is satisfied, power generated by the engine is transmitted to the drive wheel and the electric motor is stopped; and
an electricity generation priority mode program according to which when the third travel condition is satisfied, power generated by the engine is transmitted to the drive wheel and is used to allow the electric motor to operate for regeneration.

4. The leisure vehicle according to claim 1, wherein the plurality of mode programs includes:
a sharp acceleration-enabled mode program according to which when a predetermined acceleration condition is satisfied, a torque transmitted from the engine to the drive wheel is increased and the electric motor is switched from a regeneration state to a vehicle drive assist state where the electric motor provides vehicle drive power; and
another mode program according to which a process is performed when the acceleration condition is satisfied, the process being different from that performed according to the sharp acceleration-enabled mode program.

5. The leisure vehicle according to claim 4, wherein according to the sharp acceleration-enabled mode program, when the acceleration condition is satisfied, power generated from acceleration of the engine is transmitted to the drive wheel, and the electric motor is switched from the regeneration state to a driving state where power generated by the electric motor is transmitted to the drive wheel, and
according to the other mode program, when the acceleration condition is satisfied, the electric motor is kept in the regeneration state or stopped and a torque transmitted from the engine to the drive wheel is increased.

6. The leisure vehicle according to claim 1, wherein the engine is disposed so as to be able to drive an electricity generator that charges a battery, and
the plurality of mode programs includes:
a charging priority mode program according to which if a remaining capacity of the battery decreases to less than a predetermined threshold when the vehicle is at rest, the electricity generator is driven by starting the engine in a state where a power transmission route between the engine and the drive wheel is cut; and
a noise prevention mode program according to which even if the remaining capacity of the battery decreases to less than the threshold when the vehicle is at rest, the state of the engine is kept the same as before the remaining capacity of the battery decreases to less than the threshold.

7. The leisure vehicle according to claim 1, wherein the engine is an electricity generation engine disposed so as to be able to drive an electricity generator that generates electricity to be supplied to the electric motor, and
the plurality of mode programs includes:
an electricity generation priority mode program according to which an output of the engine is increased when the operation amount of the accelerator operation member increases from an amount smaller than a predetermined amount and exceeds the predetermined amount; and
a silence priority mode program according to which even if the operation amount of the accelerator operation member increases from an amount smaller than the predetermined amount and exceeds the predetermined amount, the output of the engine is kept the same as before the operation amount exceeds the predetermined amount.

8. The leisure vehicle according to claim 7, wherein the plurality of mode programs includes:
a charging priority mode program according to which the engine is started if a remaining capacity of the battery decreases to less than a predetermined threshold when the vehicle is at rest; and
a noise prevention mode program according to which even if the remaining capacity of the battery decreases to less than the threshold when the vehicle is at rest, the state of the engine is kept the same as before the remaining capacity of the battery decreases to less than the threshold.

9. The leisure vehicle according to claim 1, wherein the plurality of mode programs further includes another mode program according to which the engine always runs.

10. The leisure vehicle according to claim 1, wherein when the electric motor operates for regeneration, the engine is controlled to increase its produced positive torque by an amount corresponding to a negative torque produced from regeneration by the electric motor.

11. A hybrid leisure vehicle equipped with an electric motor and an engine, the hybrid leisure vehicle comprising:
a controller that comprises a processor and a memory and that controls the electric motor and the engine based on an operation amount of an accelerator operation member operated by a user, wherein
the memory stores a plurality of mode programs each of which specifies how to change a state of the electric motor and the engine depending on vehicle-related parameters, the vehicle--related parameters including a required torque corresponding to the operation amount of the accelerator operation member operated by the user, and a traveling state of the vehicle,
in each of the plurality of mode programs, the state of the electric motor includes a driving state and a stopped state, and the state of the engine includes an ON state and an OFF state,
the processor selects a mode program from the plurality of mode programs in response to an input provided by the user, and controls the electric motor and the engine according to the selected mode program,
the plurality of mode programs includes a specific mode program in which the vehicle switches from an EV state to a HEV state and from the HEV state to an EG state in order as a required torque increases,
the EV state is a state where the engine is in the OFF state and where the electric motor is in the driving state,
the HEV state is a state where the engine is in the ON state and where the electric motor is in the driving state,
the EG state is a state where the electric motor is in the stopped state and where the engine is in the ON state,
in the EG state, the electric motor regenerates with the power generated by the engine, while the power generated by the engine is transmitted to the drive wheel, and
when the required torque is equal to or higher than a first threshold value and equal to or higher than a value of a road load curve, the vehicle is brought into the EG state.

12. The leisure vehicle according to claim 1, wherein in the EG state, the electric motor regenerates with the power generated by the engine, while the power generated by the engine is transmitted to the drive wheel.

* * * * *